[54] WELDABLE INSULATION FASTENER AND APPARATUS FOR WELDING

[75] Inventor: John C. Jenkins, Lorain, Ohio

[73] Assignee: TRW Inc., Cleveland, Ohio

[21] Appl. No.: 663,056

[22] Filed: Mar. 2, 1976

[51] Int. Cl.[2] ............................................. B23K 9/20
[52] U.S. Cl. ...................................... 219/98; 219/103
[58] Field of Search ............................ 219/98, 99, 103

[56] References Cited

U.S. PATENT DOCUMENTS

| | | | |
|---|---|---|---|
| 2,885,531 | 5/1959 | Aversten | 219/99 |
| 3,601,574 | 8/1971 | Fiddler | 219/99 X |
| 3,869,361 | 3/1975 | Jenkins | 219/99 X |
| 3,993,237 | 11/1976 | Sauder et al. | 219/99 X |

OTHER PUBLICATIONS

Technical Bulletin, Nelson Brochure, "Application Data: Corrugated Aluminum." Application 421.2, *Nelson Stud Welding*, dated Sept. 24, 1958.

Primary Examiner—J. V. Truhe
Assistant Examiner—N. D. Herkamp
Attorney, Agent, or Firm—Allen D. Gutchess, Jr.

[57] ABSTRACT

A weldable fastener for supporting insulation adjacent to a surface and apparatus for welding the fastener are provided. The insulation fastener is specifically designed for applying insulating material to the outer surface of a wall of a cryogenic container, which walls are commonly made of aluminum. The fastener includes, in the preferred form, an aluminum stud having a weldable end and a recess at the opposite end. A strong plastic-glass fiber rod, which is preferably made by a pultrusion process, is affixed in the recess of the stud and extends outwardly therefrom, coaxially with the stud. After the insulation is placed over the rod and stud and against the surface, a suitable clip or washer is applied over the end of the rod to hold the insulation in place. The apparatus for welding the stud to the surface includes a stud welding tool which operates by a known end-welding technique. The tool has a chuck leg terminating in an offset member holding a chuck at one side of the tool. The tool also has an offset welding foot which locates a welding ferrule at the one side of the tool and in alignment with the chuck. The chuck has a through passage to enable the rod of the weldable stud to extend past the one side of the tool when the stud is in position in the chuck and ready for welding.

9 Claims, 9 Drawing Figures

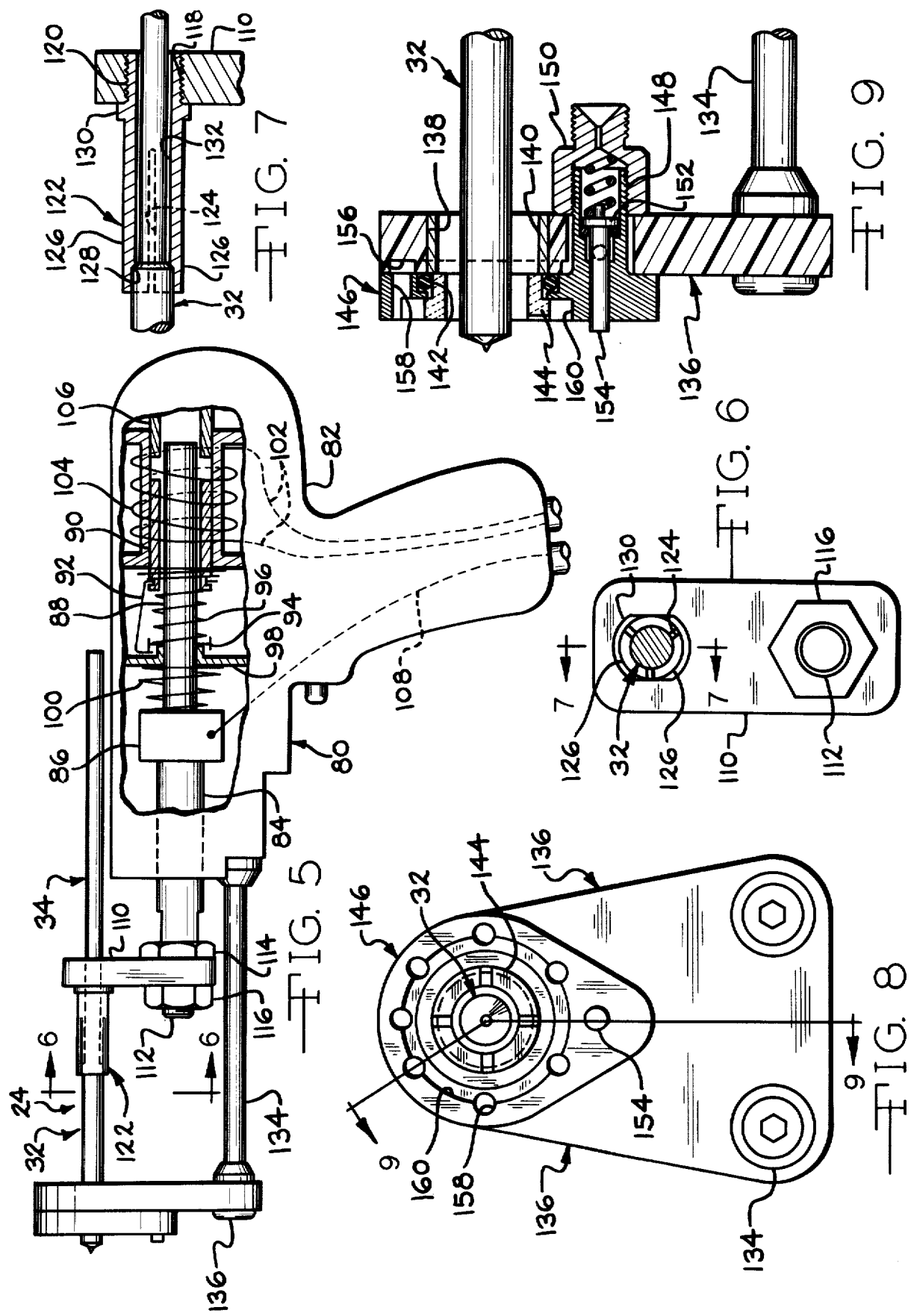

WELDABLE INSULATION FASTENER AND APPARATUS FOR WELDING

This invention relates to a fastener particularly for insulation and to apparatus for affixing the fastener to a surface.

The insulation fastener according to the invention is particularly designed for use with cryogenic containers which commonly have aluminum walls to enable them to withstand the very low temperatures to which they are subjected. Thick layers of insulation are located against the outer surfaces of the container walls. The insulation fastener according to the invention enables the insulation to be applied to the outer surfaces of the walls of such containers rapidly and efficiently. The new fastener includes a metal stud having a weldable end which can be affixed by an end welding technique to the outer surface of the container wall. The stud is preferably of aluminum so as to be compatible with the container material, and preferably has a conical configuration at the weldable end terminating in a small outwardly-extending tip. The opposite end of the stud has a central, elongate recess therein which receives a strong rod of low conducting material, the rod extending beyond the outer surface of the insulating layer. The rod is held in the recess of the stud by being crimped therein and, to provide a positive mechanical engagement, the rod preferably has a shallow groove to receive the inwardly-extending surfaces of the crimps. The rod, in a preferred form, is made of glass fibers impregnated and encased in resin and formed by a pultrusion process. A flat clip or washer is placed on and mechanically engaged with the outer end of the rod to hold the insulation in place against the container wall.

In order to weld the preassembled combination fastener to the wall of the cryogenic container, a special welding tool is employed. The tool incorporates an offset chuck adapter member which is affixed to an outer end of a chuck leg of the tool and extends transversely to hold a chuck parallel to but spaced from the chuck leg. The chuck has a passed extending completely therethrough with the low conducting rod of the fastener extending through the chuck and to the side of the tool when the stud is held in the outer end of the chuck by resilient fingers thereof. The welding tool also has a welding foot carrying a gas shield affixed to another offset member and aligned with the chuck and the passage therethrough. A ceramic ferrule is also carried by the welding foot to contain the molten metal formed as the stud is welded to the surface.

It is, therefore, a principal object of the invention to provide an improved insulation fastener and apparatus for affixing the fastener to a surface.

Another object of the invention is to provide a preassembled insulation fastener for cryogenic containers, which fastener includes an aluminum stud having a weldable end and a recessed end and a rod of low conducting material affixed mechanically in the recess.

A further object of the invention is to provide apparatus for welding an elongate fastener, which apparatus includes an offset member for positioning a chuck to one side of the tool with the chuck having a passage extending completely therethrough to receive a portion of the elongate fastener.

Many other objects and advantages of the invention will be apparent from the following detailed description of preferred embodiments thereof, reference being made to the accompanying drawings, in which:

FIG. 5 is a somewhat schematic view in elevation, with parts broken away and with parts in cross section, of apparatus for welding the insulation fastener, with the fastener being shown in a position to be welded;

FIG. 6 is a transverse view on an enlarged scale taken along the line 6—6 of FIG. 5;

FIG. 7 is a fragmentary view in longitudinal cross section taken along the line 7—7 of FIG. 6;

FIG. 8 is an enlarged front view of a welding foot and a gas shield of the apparatus of FIG. 5; and FIG. 9 is a view in transverse cross section taken along the line 9—9 of FIG. 8.

Figure 1:
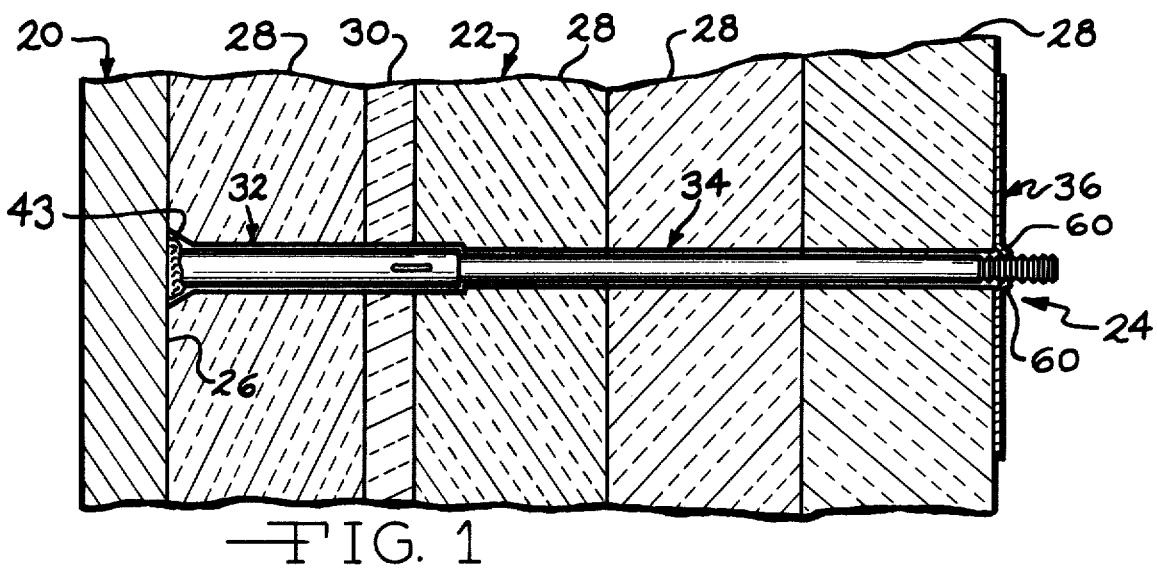
FIG. 1 is a fragmentary view in transverse cross section taken through a wall of a cryogenic container and layers of insulation adjacent thereto, and showing a fastener assembly welded in position and holding the insulating layers in place.

Referring particularly to FIG. 1, a cryogenic container or the like has a wall 20 to which insulation 22 is attached by an insulation fastener 24. The insulation 22 is positioned contiguous to an outer surface 26 of the wall 20 and can take a variety of forms. As shown, the insulation 22 includes four relatively rigid layers 28 of insulating material with a thinner layer or blanket 30 of more yieldable insulating material located between two of the layers 28. This provides a degree of resiliency or tolerance for the overall thickness of the insulation 22. It is to be understood, however, that the invention is not to be limited to being applicable to any specific type, thickness, shape, or number of layers of insulating material or even to insulating material at all.

The insulation fastener 24 basically includes a composite assembly of a weldable stud 32 and a rod or rod-like elongate member 34 of low conducting material. A suitable clip or washer 36 is placed over and affixed to the outer end of the rod 34 after the stud 32 is welded to the wall 20 and the insulation 22 is in place. The insulation 22 can, in at least some instances, be affixed to the container by impaling the insulating layers 28 and 30 on the rod 34 and the stud 32. If the insulation is not of a nature that it can be so impaled, it can be bored out to form a passage having a diameter larger than that of the stud and the rod and placed thereover. A foamable material can then be inserted through a suitable opening in the clip 24 and foamed in situ in the passage to provide a continuous thermal barrier around the entire container.

Figure 2:
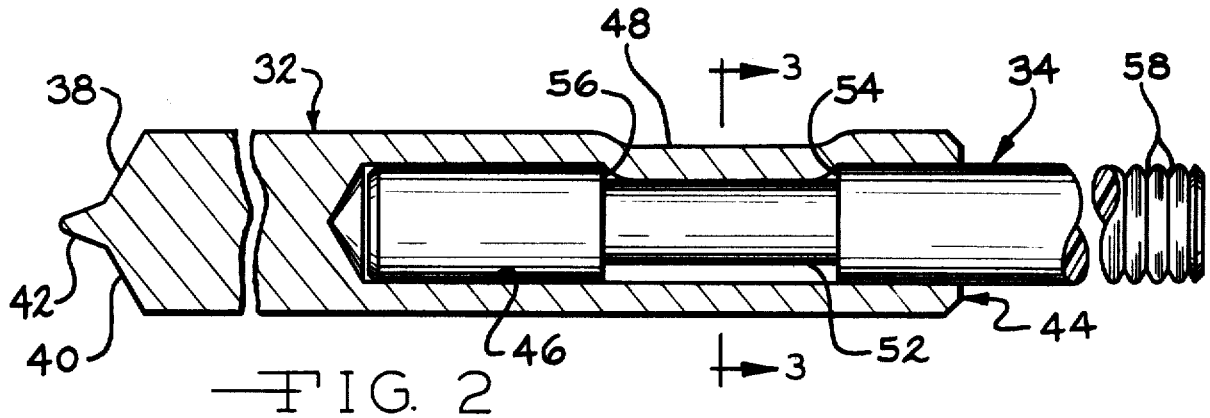
FIG. 2 is a greatly enlarged, fragmentary view in longitudinal cross section taken through a stud and a rod of the fastener of FIG. 1.

Referring particularly to FIG. 2, the stud 32 is of metal and is preferably of aluminum when used in cryogenic applications since the wall 20 of the cryogenic container also usually is of aluminum to withstand the very low temperatures encountered. The stud 32 has a weldable end 38 which includes an outer relatively shallow conical surface 40 and a central tip 42. When the stud 32 is welded to the surface 26 of the wall 20, the tip 42 and at least most of the conical portion 40 are fused, leaving a weld bead 43 (FIG. 1).

An end 44 of the stud 32 opposite the weldable end 38 has a centrally-located, axially-extending, elongate recess 46, Crimps 48 are formed at intermediate portions of the elongate recess 46 and produce inwardly-extending ridges 50. The rod 34 is received in the recess 46 prior to the crimping and extends outwardly from the stud 32 in a co-axial manner. A portion of the rod 34 received in the recess is cut away to form an annular, wide, shallow groove 52 into which the ridges 50 of the crimps 48 extend when the crimps are formed with the rod in place. Preferably, the length of the crimps 48 is such that the ends of the ridges 50 bear against shoulders 54 and 56 which are formed in the rod 34 at the ends of the shallow groove 52. This prevents any possibility of longitudinal movement of the rod 34 relative to the stud 32.

In the form shown in FIGS. 1 and 2, the outer end of the rod 34 has a plurality of narrow, annular grooves 58 formed therein to receive fingers or tangs 60 of the clip 36. The tangs are sufficiently resilient that the clip 36 can be pushed onto the end of the rod 34 to hold the insulating layers 28 and 30 securely in place, with the tangs 60 then being mechanically engaged in the appropriate one of the grooves 58 of the rod. If desired, the grooves 58 can be eliminated and the tangs 60 can be shaped and sized such as to simply bite into the outer surface of the rod 56 at any position where the clip 36 is placed, to resist outward movement of the clip relative to the rod.

The rod 34 is of low conducting material and, in a preferred form, is made of longitudinally-extending glass fibers impregnated and encased with resin. Such a rod preferably is made by a pultrusion process which forms a very strong rod and yet one having low conductivity. With the longitudinally-extending fibers of the rod, the annular grooves 58 are formed rather than a continuous helical thread which would tend to destroy the outer fibers of the pultruded rod. The specific clip employed with the rod does not form part of this invention.

Figure 4:
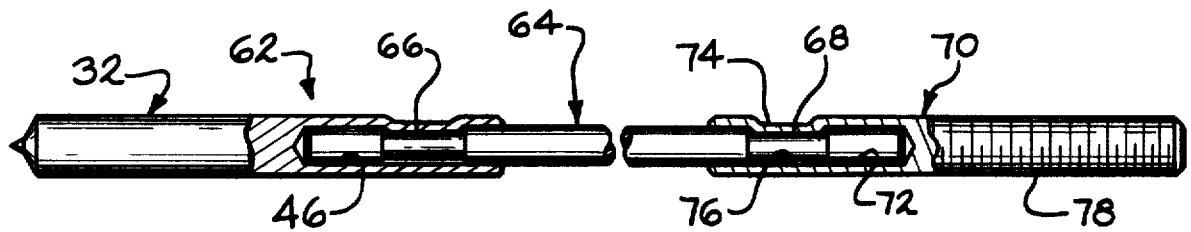
FIG. 4 is a fragmentary view on a smaller scale, with parts broken away and with parts in cross section, of a modified insulation fastener.
Figure 3:
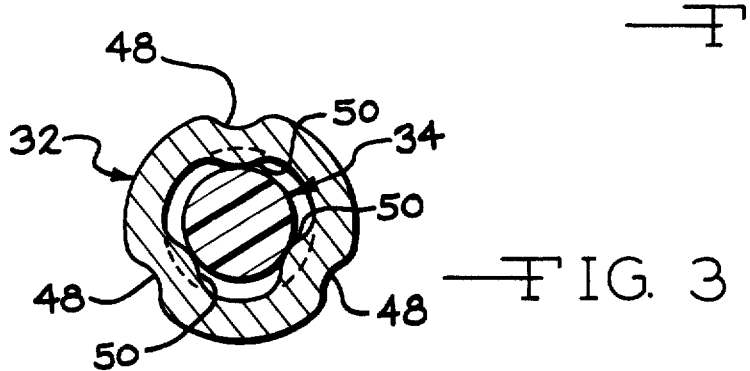
FIG. 3 is a view in a transverse cross section showing a mechanical connection between the stud and the rod, taken along the line 3—3 of FIG. 2.

A slightly modified insulation fastener embodying the invention is indicated at 62 in FIG. 4. The fastener 62 includes the end-weldable stud 32 and a modified pultruded rod 64 extending rearwardly therefrom. The rod has a wide, shallow groove 66 corresponding to the groove 52 at the end received in the recess 46 of the stud 32 and, in this instance, also has an annular, wide, shallow groove 68 near the outer end. A metal extension 70 is located at the outer end of the rod 64 and has a recess 72 which receives this end of the rod. Crimps 74 are formed at intermediate portions of the recess 72 and form inwardly-extending ridges 76. The ridges 76 are received in the shallow recess 68 to provide a secure mechanical connection between the rod 64 and the extension 70. With the extension 70 being made of metal, an outer thread 78 can be machined at the end thereof. A clip similar to the clip 36, but with appropriately formed tangs or fingers, can then be threaded thereon. The clip is turned onto the thread 78 until it is snug against the outer surface of the insulation 22.

Installation of both of the fasteners 24 and 64 is relatively simple because the components are preassembled. The stud 32 and the rod 34 or the stud 32, the rod 64, and the extension 70, are supplied in one piece as complete assemblies. The stud 32 is then simply welded to the surface 26 of the wall 20 and the insulation placed over the rod 34 or the rod 64 and the extension 70, with a clip then added in a quick and efficient manner.

The stud 32 is welded to the wall 20, in a preferred form, by a drawn-arc welding technique. In order to weld the long fastener 24 or 62, a special welding tool is employed, such as is shown in FIGS. 5–9. For this purpose, a tool 80 includes means for retracting the stud from the workpiece, means for holding the stud in the retracted position, means for subsequently moving the stud toward and against the workpiece. A power source and controls initiate a low current between the stud and the workpiece as the stud is withdrawn, in order to form a pilot arc. The controls also determine when the stud is plunged back toward the workpiece, and when a higher current is imposed on the pilot arc to establish a main welding arc between the stud and the workpiece. The main welding arc fuses the tip 42 and at least a portion of the conical end 40, along with a portion of the workpiece. The molten metal portions then join and solidify when the stud engages the workpiece at the end of the plunge stroke, thereby providing a secure weld therebetween.

The stud welding tool 80 is basically of a known design and includes a main body or housing 82 of suitable dielectric material. A chuck leg 84 extends forwardly of the body 82 and, within the body, terminates in a welding cable head or terminal 86. The head 86 is connected to a lifting rod 88 which extends rearwardly through a movable core 90. A lifting hook 92 is attached to the core 90 and engages a lifting ring 94 when moved rearwardly.

The inner diameter of the lifting ring 94 slightly exceeds the outer diameter of the lifting rod 88 so that the rod can move longitudinally relative to the ring when the ring is held perpendicular thereto. The ring is normally so held by a lifting ring spring 96 which urges the ring against a rear annular extension of a stop plate 98. The plate 98, in turn, is held against shoulders (not shown) within the body 82 by a main plunge spring 100 located between the plate 98 and the head 86. With this design, the lifting rod 88 can be moved back somewhat when the end of the stud 32 is pressed against the surface 26 of the wall 20 prior to being welded. However, when the ring 94 is moved by the lifting hook 92 and the core 90 to a canted position, further retraction of the core 90 also causes the lifting rod 88 to retract the same distance as the core. Consequently, all of the studs to be welded will be retracted a uniform, predetermined distance from the workpiece during the lifting or retraction stroke, even though their length may differ somewhat so that some are pushed back more than others when initially pressed against the workpiece.

The movable core 90 is retracted when current is supplied through suitable leads 102 to a lifting or holding coil 104. The extent of the rearward movement of the core, which determines the distance the stud is retracted, is determined by the position of an adjustable core stop 106. Current for the pilot arc and the main welding arc are sipplied to the chuck leg 84 through a cable 108 suitably connected to the head 86.

Because of the length of the fastener 24 and specifically the rod 34, it is not feasible to hold the stud 32 directly in front of the chuck leg 84, as has heretofore been conventional in the art. Therefore, in accordance with the invention, an offset chuck adapter or member 110 is affixed to the end of the chuck leg 84 and extends transversely thereof. As shown, the offset adapter is received on a threaded end 112 of the chuck leg 84 and is held in position by two adjustable nuts 114 and 116. At a location spaced from the chuck leg 84, the offset adapter 110 has a threaded opening 118 (FIG. 7) which receives a threaded end 120 of a chuck 122. The chuck 122 has longitudinally-extending slots 124 which form resilient fingers or tines 126, there being three in this instance. The tines 126 have shoulders 128 near their extremities which abut and back up the outer end of the stud 32. The chuck 122 also has a shoulder flange 130 which abuts the offset adapter 110. The flange 130 can be engaged by a wrench for removal of the chuck from the offset adapter 110 for replacement, as is commonly required with such chucks from time-to-time.

Of particular importance, the chuck 122 has a passage 132 extending completely therethrough from the ends of the tines 126 to the extremity of the threaded end 120. This enables the rod 34 to extend completely through the chuck and the offset adapter 110 when the stud 32 is firmly engaged in the chuck. The distance from the front of the tool body 82 to the offset adapter 110 is less than the length of the rod 34. However, the offset adapter 110 is sufficiently long that the rod 34 can extend back to one side of the tool body 82, as shown in FIG. 5. Hence, with this arrangement, the tool 80 can accommodate the long fastener 24 and effectively weld the stud 32 without having to assume unwieldy dimensions and design.

In order to weld the elongate fastener 62, or a similar fastener with an enlarged outer end, the top of the chuck 122 and the top of the offset adapter 110 can have slots therein. The width of the slots exceed the diameter of the rod 64 so that the rod can be inserted in the slots and then retracted to move the stud 32 into the chuck with the end of the stud abutting the shoulders 128 of the tines 126. The slotted chuck can be held in the slotted adapter by a setscrew rather than try the threaded connection to assure that the slots will be aligned when the chuck and adapter are assembled.

The welding tool 80 also has two welding foot legs 134 extending forwardly of the body 82 and mounted therein in an adjustable manner, as is known in the art. At the extremities of the legs 134 is an offset welding foot 136 which also extends transversely a substantial distance from the legs 134. The welding foot 136 has an opening 138 therein (FIGS. 8 and 9) which is aligned with the chuck 122 and through which the stud 32 centrally extends. The opening 138, in this instance, has a protective liner 140 and the foot has means in the form of an O-ring 142, in this instance, to yieldably hold a spark shield member shown specifically in the form of a welding ferrule 144. The welding ferrule 144 is of a ceramic construction as is well known in the art and surrounds the weldable end of the stud 32 during the welding operation to contain the molten metal and prevent weld splatter on adjacent components.

In this instance, the O-ring 142 is held between the front of the offset foot 110 and a gas shield member 146 mounted at the front of the foot 136 by suitable fasteners (not shown). The shield is also held by an extension 148 which extends through the foot and is threadedly-engaged by a fitting 150 which receives a gas supply line. The gas shield 146 is particularly advantageous when used with the aluminum ferrule to prevent a weak, porous weld from resulting. The gas, preferably an inert gas such as helium or argon, from the supply line attached to the fitting 150 flows past a valve 152 which opens when a valve stem 154 and the gas shield are pressed against the workpiece. The gas then flows through an annular manifold 156 around the opening 138 and through suitable ports 158 to an annular chamber 160 surrounding the ferrule 144 and the stud. After the stud is welded and the foot 136 is removed from the workpiece, the valve 152 closes again until the next weld.

With other studs not requiring the gas atmosphere, the ferrule 144 can be suitably held in the offset welding foot 136 in a known manner with the offset foot 136 again being of sufficient length to align the ferrule and the stud held by the chuck 122 and the offset adapter 110.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. In combination, a cryogenic container having an aluminum wall, an elongate fastener for holding a layer of insulating material adjacent an outer surface of said aluminum wall, said fastener comprising an end-weldable stud of aluminum having a weldable tip at one end thereof and having means at the opposite end for affixing an elongate member thereto, an elongate member of low-conducting material having one end affixed to said affixing means of said stud and extending co-axially away from said stud, said elongate member being made of a multiplicity of longitudinally-extending, parallel glass fibers encased in a resinous material, the end of said elongate member opposite said stud having means to receive a clip to aid in holding the layer of insulating material adjacent the surface of said aluminum wall, and a clip on said elongate member and held by said clip-receiving means for contacting an outer surface of the layer of insulating material to hold it against the surface of the aluminum wall.

2. The combination according to claim 1 characterized by said affixing means at the opposite end of said stud being a recess formed centrally in the opposite end and receiving an end of said elongate member, the end of said elongate member received in said recess having a shallow annular groove therein, and said affixing means further forming an elongate ridge projecting into said shallow annular groove and engaging said elongate member.

3. The combination according to claim 1 wherein the elongate fastener is characterized by said clip-receiving means of said elongate member comprising a plurality of parallel annular grooves formed in said member.

4. The combination according to claim 1 wherein the elongate fastener is characterized by said clip-receiving means comprising an elongate metal extension member affixed to said rod.

5. The combination according to claim 4 wherein the elongate fastener is characterized by said metal member having a threaded end.

6. The combination according to claim 5 wherein the elongate fastener is characterized by said metal member having a recess receiving the outer end of said elongate member.

7. The combination according to claim 6 wherein the elongate fastener is characterized by said elongate member being affixed in said recess of said metal member by a crimp in said member extending into said recess.

8. Means for affixing a layer of insulation to a surface of a metal wall of a cryogenic container, said means comprising a fastener having a metal end-weldable stud with a weldable tip at one end thereof and with a recess at the other end thereof, and an elongate rod of non-metallic, low-conducting material having one end received in said stud recess and affixed therein by at least one inwardly-extending crimp in said stud forming a ridge projecting into said stud recess, the end of said rod in said recess having a groove therein into which said ridge of said stud extends, said elongate rod being of substantially uniform cross section throughout its length with the maximum transverse dimension not exceeding the maximum transverse dimension of said stud, and a clip having a plurality of inwardly-extending tangs located on the end of said rod opposite said stud with the tangs engaging said rod to hold said clip in a fixed longitudinal position relative to said rod.

9. Means according to claim 8 characterized by said opposite end of said rod having a plurality of annular, parallel grooves therein, said tangs of said clip extending into a common one of said annular, parallel grooves.

* * * * *